United States Patent
Hsu et al.

(10) Patent No.: US 10,712,648 B2
(45) Date of Patent: Jul. 14, 2020

(54) WAVELENGTH-CONVERTING WHEEL AND PROJECTION APPARATUS

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/354,199

(22) Filed: Mar. 15, 2019

(65) Prior Publication Data
US 2019/0353994 A1 Nov. 21, 2019

(30) Foreign Application Priority Data
May 17, 2018 (CN) .................... 2018 2 0732209 U

(51) Int. Cl.
| | | |
|---|---|---|
| *G03B 21/20* | (2006.01) | |
| *G03B 21/16* | (2006.01) | |
| *G02B 26/00* | (2006.01) | |

(52) U.S. Cl.
CPC ......... *G03B 21/204* (2013.01); *G02B 26/008* (2013.01); *G03B 21/16* (2013.01)

(58) Field of Classification Search
CPC .... G03B 21/204; G03B 21/16; G02B 26/008; G02B 26/007; G02B 26/00; F21V 7/26; F21V 7/30; F21V 9/08; F21V 9/30; F21V 9/40; F21V 9/45
See application file for complete search history.

(56) References Cited

U.S. PATENT DOCUMENTS

| | | | | |
|---|---|---|---|---|
| 9,341,933 B2* | 5/2016 | Jao | ............................. | F21V 13/14 |
| 9,503,700 B2* | 11/2016 | Dai | ....................... | H04N 9/3158 |
| 2011/0222149 A1* | 9/2011 | Saito | ..................... | G03B 21/204 |
| | | | | 359/443 |
| 2014/0362349 A1 | 12/2014 | Chiu et al. | | |
| 2015/0098070 A1* | 4/2015 | Hsieh | ..................... | G03B 21/204 |
| | | | | 355/67 |
| 2017/0175989 A1* | 6/2017 | Yamagishi | ................ | G03B 33/08 |
| 2017/0227192 A1* | 8/2017 | Ikeda | ......................... | F21V 29/89 |
| 2018/0031958 A1* | 2/2018 | Ikeda | ......................... | B32B 37/10 |
| 2018/0299110 A1* | 10/2018 | Asano | ................... | G03B 21/204 |

FOREIGN PATENT DOCUMENTS

| | | |
|---|---|---|
| CN | 102073115 A | 5/2011 |
| CN | 102900807 A | 1/2013 |
| CN | 106483746 A | 3/2017 |
| TW | I579634 B | 4/2017 |

* cited by examiner

*Primary Examiner* — Bao Q Truong

(57) ABSTRACT

A wavelength-converting wheel has a light incident side. The wavelength-converting wheel includes a disc, a heat conductive glue, a reflective layer, a plurality of protrusions, a heat conductive glue, and a wavelength-converting layer. The disc has an inner ring portion and an annular portion. The annular portion is connected to an outer edge of the inner ring portion. The annular portion includes a protrusion structure region. The protrusions are disposed in the protrusion structure region and protrude toward the light incident side. The heat conductive glue is disposed on the protrusion structure region. The reflective layer is disposed on the heat conductive glue. The wavelength-converting layer is disposed on the reflective layer and has a light receiving surface facing the light incident side.

18 Claims, 7 Drawing Sheets

WAVELENGTH-CONVERTING WHEEL AND PROJECTION APPARATUS

CROSS-REFERENCE TO RELATED APPLICATION

THIS APPLICATION CLAIMS THE PRIORITY BENEFIT OF CHINA APPLICATION (CN201820732209.0 FILED ON May 17, 2018). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display apparatus, and more particularly to a wavelength-converting wheel and a projection apparatus using the wavelength-converting wheel.

BACKGROUND OF THE INVENTION

With the market demands for brightness, color saturation, service life, non-toxicity and environmental protection of the projection apparatus, the type of the light source applied on the projection apparatus is evolved from an ultra-high pressure mercury lamp (UHP lamp), a light emitting diode (LED) to a laser diode (LD).

Currently, the costs of high-brightness red laser diodes and green laser diodes are still high. To decrease the cost, a part of the blue light of a blue laser diode is usually applied to excite the phosphor powders on the phosphor wheel to generate a yellow light or a green light, and another part of the blue light of the blue laser diode is reflected by or penetrates through the phosphor wheel. A desired red light is filtered from the yellow light, and then combined with the reflected or penetrated blue light to constitute the three primary colors of red, green, and blue required for the projection images.

Conventionally, a heat conductive glue is applied to adhere a sheet-like phosphor layer made by sintering to a substrate to fabricate a phosphor wheel, or further arranging a reflective layer, such as a sintered reflective layer, between the sheet-like phosphor layer and the substrate. However, the heat conductivity (K) of the heat conductive glue is about 2 W/(m·K) [Watt/(meter·degree)] to 10 W/(m·K), and the heat conduction of the heat conductive glue decreases sharply with the increase in the thickness of the heat conductive glue. If the thickness control of the heat conductive glue is unstable, the heat conductions of the fluorescent layer and the reflective layer will be affected obviously; thereby affecting the wavelength conversion efficiency of the phosphor layer and the reflection efficiency of the reflective layer. Moreover, the material may be deteriorated and damaged (blackened) due to the excessive temperature of the phosphor layer and the reflective layer.

In addition, transparent silicon is also applied to replace the heat conductive glue conventionally. A reflective coating film is disposed on the substrate to replace the reflective layer, and the thickness of silicon is controlled to less than 0.05 mm. However, the heat conductivity of silicon is merely about 0.2 W/(m·K) to 0.3 W/(m·K). Therefore, even if the thickness of the silicon is very thin, the heat conduction of silicon is limited, and thereby the wavelength conversion efficiency of the phosphor layer is poor, and the material may be deteriorated or damaged.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art

SUMMARY OF THE INVENTION

The invention provides a wavelength-converting wheel, which has good heat conducting ability, can promote the wavelength conversion efficiency and avoid the deterioration or the damage of material.

The invention provides a projection apparatus, and the wavelength-converting wheel thereof has good heat conducting ability, can promote the wavelength conversion efficiency and avoid the deterioration or the damage of material.

Other objectives and advantages of the invention can be further understood from the technical features disclosed by the invention.

In order to achieve one or partial or all of the above or other objectives, an embodiment of the invention provides a wavelength-converting wheel having a light incident side. The wavelength-converting wheel includes a disc, a heat conductive glue, a plurality of protrusions, a reflective layer, and a wavelength-converting layer. The disc has an inner ring portion and an annular portion. The annular portion is connected to an outer edge of the inner ring portion. The annular portion includes a protrusion structure region. The protrusions are disposed in the protrusion structure region and protrude toward the light incident side. The heat conductive glue is disposed on the protrusion structure region. The reflective layer is disposed on the heat conductive glue. The wavelength-converting layer is disposed on the reflective layer and has a light receiving surface facing the light incident side.

In order to achieve one or partial or all of the above or other objectives, an embodiment of the invention provides a projection apparatus, which includes an illumination system, a light valve and a projection lens. The illumination system is configured to provide an illumination beam. The light valve is disposed on a transmission path of the illumination beam to convert the illumination beam into an image beam. The projection lens is disposed on a transmission path of the image beam. The illumination system includes an exciting light source and the above-mentioned wavelength-converting wheel. The exciting light source is configured to provide an excited beam. The wavelength-converting wheel is disposed on a transmission path of the excited beam. The wavelength-converting layer of the wavelength-converting wheel is configured to convert the excited beam into a converted beam. The illumination beam includes the converted beam and the excited beam.

In summary, in the projection apparatus and the wavelength-converting wheel of the embodiments of the invention, by disposing the protrusions on the disc of the wavelength-converting wheel facing the light incident side, the usage of the heat conductive glue to adhere the reflective layer and the wavelength-converting layer is reduced, and the thickness of the heat conductive glue is controlled. Accordingly, the heat dissipating ability of the wavelength-converting wheel is improved, and thereby not only avoiding excessive heat to damage the wavelength conversion efficiency of the wavelength-converting layer and the reflection efficiency of the reflective layer, but also ensuring the materials of the wavelength-converting and the reflective layer not deteriorated and not damaged by heat.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
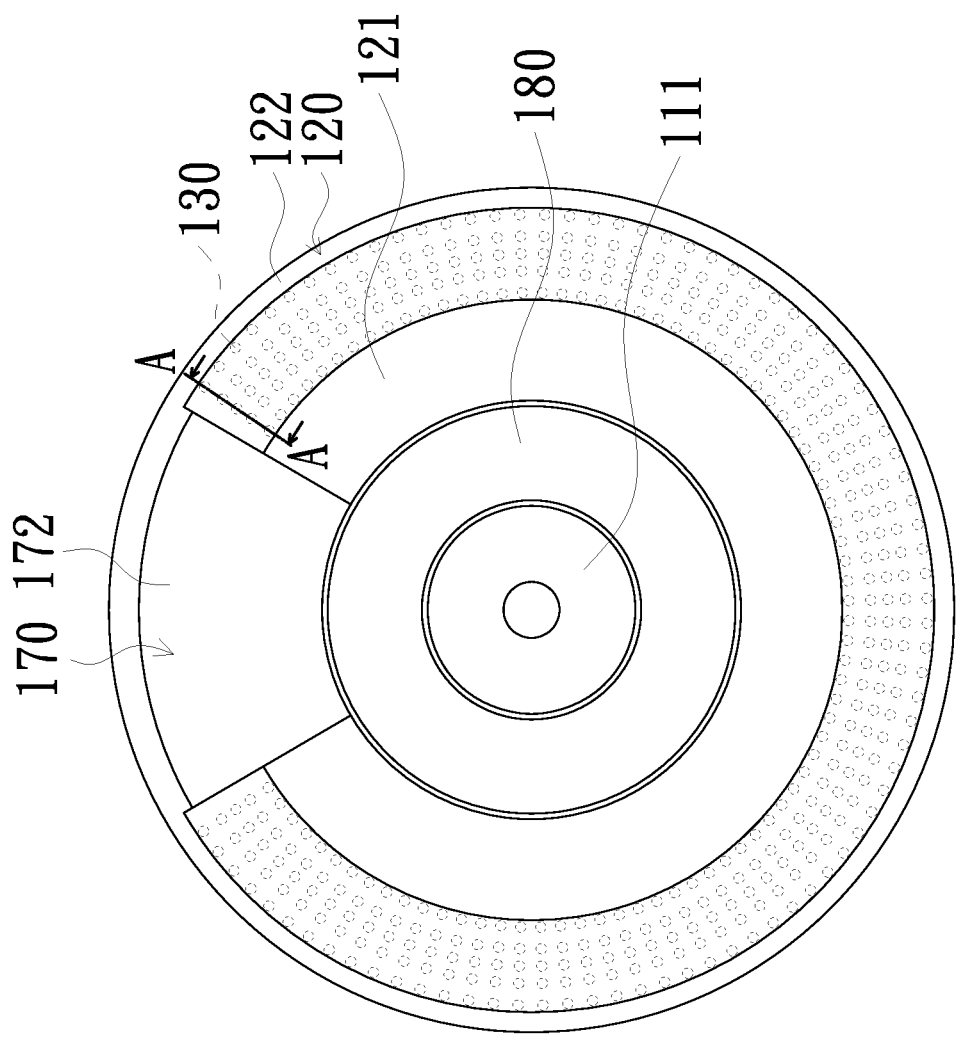
FIG. 1 is a partially schematic view of a wavelength-converting wheel according to an embodiment of the invention.
Figure 2:
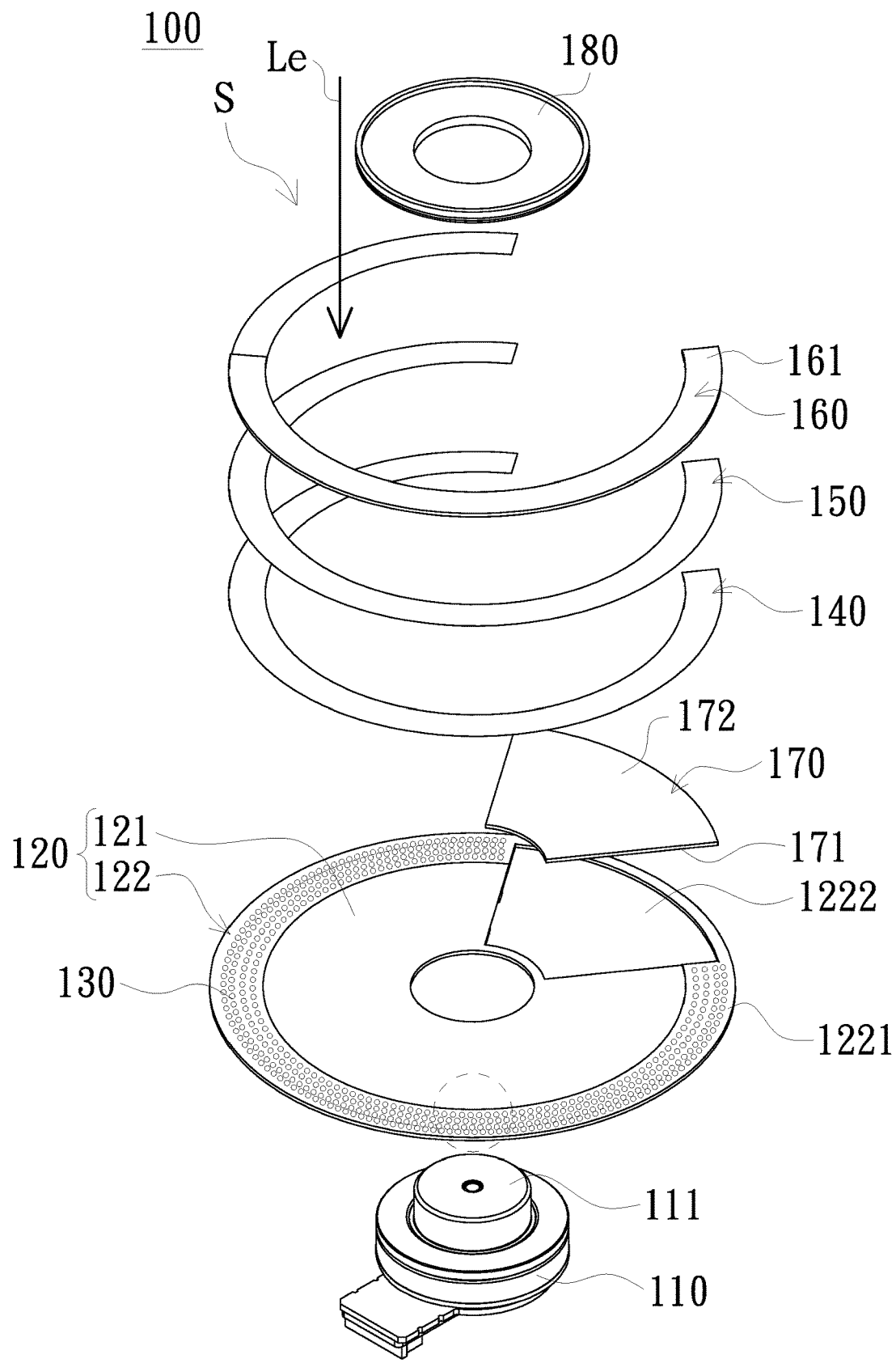
FIG. 2 is an exploded view of the wavelength-converting wheel shown in FIG. 1.
Figure 3:
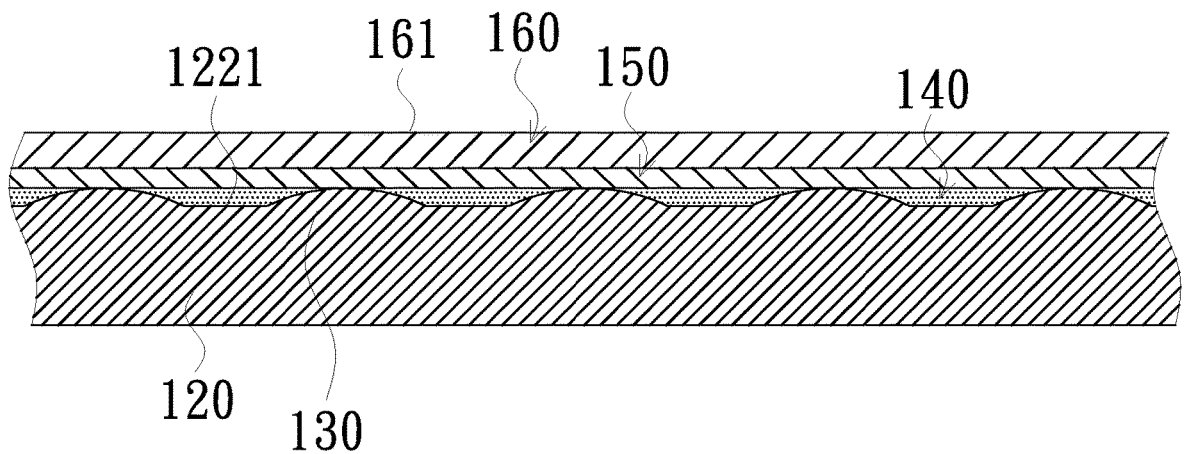
FIG. 3 is a schematic cross-sectional view taken along the line A-A in FIG. 1.
Figure 4:
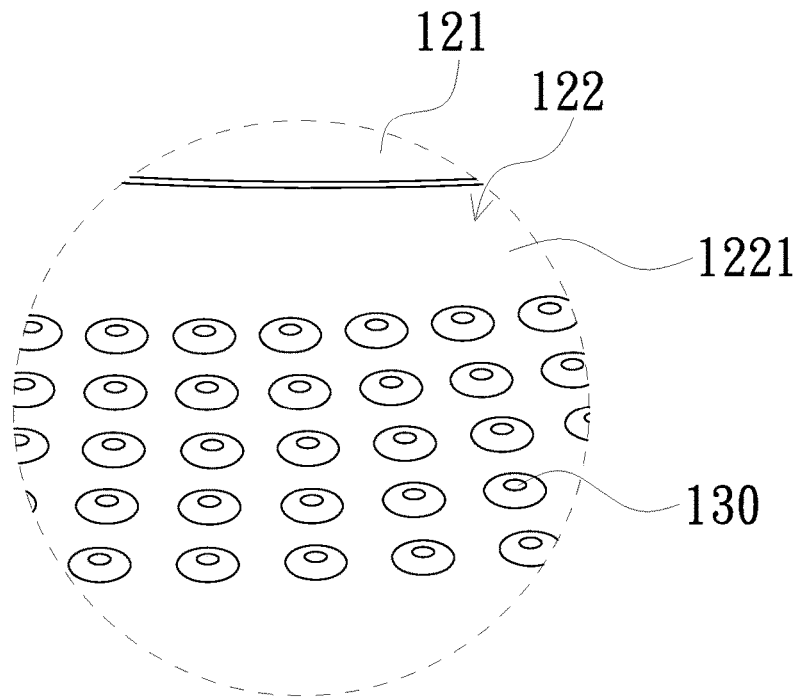
FIG. 4 is a partially enlarged view of a disc of the wavelength-converting wheel shown in FIG. 2.

FIG. 1 is a partially schematic view of a wavelength-converting wheel according to an embodiment of the invention. FIG. 2 is an exploded view of the wavelength-converting wheel shown in FIG. 1. FIG. 3 is a schematic cross-sectional view taken along the line A-A in FIG. 1. FIG. 4 is a partially enlarged view of a turntable of the wavelength-converting wheel shown in FIG. 2. Referring to FIGS. 1 to 4, the wavelength-converting wheel 100 of the embodiment has a light incident side S configured to receive an excited beam Le. The wavelength-converting wheel 100 includes a motor 110, a turntable 120, a plurality of protrusions 130, a heat conductive glue 140, a reflective layer 150, and a wavelength-converting layer 160. The motor 110 has a rotating shaft 111. The disc 120 has an inner ring portion 121 and an annular portion 122. The inner ring portion 121 is sleeved on the rotating shaft 111. The annular portion 122 is connected to an outer edge of the inner ring portion 121. The annular portion 122 refers to a zone of the disc 120 corresponding to a zone of the wavelength-converting layer 160 irradiated with the excited beam Le while the disc 120 rotates. The annular portion 122 includes, for example, a protrusion structure region 1221 and an optical region 1222. The optical region 1222 is adjacent to the protrusion structure region 1221. The protrusions 130 are disposed in the protrusion structure region 1221 and protrude toward the light incident side S. The protrusions 130 are, for example, arc protrusions having arc-shaped surfaces, but the invention is not limited thereto. The protrusions 130 are, for example, trapezoid protrusions, cone protrusions, square protrusions, or other geometrically shaped protrusions. The heat conductive glue 140 is disposed on the protrusion structure region 1221, filled between the protrusions 130 and disposed above the protrusions 130. The reflective layer 150 is disposed on the heat conductive glue 140. The wavelength-converting layer 160 is disposed on the reflective layer 150 and has a light receiving surface 161 facing the light incident side S. The material of the wavelength-converting layer 160 includes, for example, a fluorescent material, an excitable material such as a phosphor, or a nano material such as a quantum dot, but the invention is not limited thereto. The wavelength-converting layer 160 may also include a plurality of blocks, each of which is disposed with a wavelength-converting material that can excite beams of different colors. In addition, the wavelength-converting wheel 100 may further include a fixing ring 180 sleeved on the rotating shaft 111, so as to fix the inner ring portion 121 of the disc 120 between the fixing ring 180 and the motor 110. In other words, the fixing ring 180 and the motor 110 clamp (are disposed to clamp) the disc 120.

The protrusion structure region 1221 refers to a zone of the wavelength-converting layer 160 which is excited by the excited beam Le to perform a wavelength conversion and has generated an excited beam (color light). The optical region 1222 refers to a zone which reflects the excited beam Le or allows the excited beam Le to penetrate therethrough. In the embodiment, referring to FIGS. 1 and 2, the optical region 1222 is, for example, a light reflecting region. The light reflecting region is, for example, a fan-shaped opening disposed on the disc 120 and extends from the annular portion 122 to the inner ring portion 121. The wavelength-converting wheel 100 further includes a plate 170. The plate 170 is disposed at the light reflecting region and has a reflective surface. The plate 170 is, for example, a fan-shaped plate corresponding to the fan-shaped opening (light reflecting region). The plate 170 includes a glass substrate 171 and a reflective film 172. The glass substrate 171 of the plate 170 is embedded in the opening (light reflecting region). The reflective film 172 is disposed (coated) on the glass substrate 171. The material of the reflective film 172 includes, for example, a material having reflection function, such as metal, but the invention is not limited thereto. The reflective surface is a surface of the reflective film 172. In addition, in some embodiments, the optical region 1222 may be a light penetrating region. The light penetrating region may also be, for example, an opening without being disposed with any optical element and is for allowing the excited beam Le to penetrate therethrough directly. In other embodiment, the optical region 1222 may be a light penetrating region. The plate 170 is disposed in the opening of the light penetrating region. The plate 170 is, for example, the glass substrate 171 for allowing the excited beam Le to penetrate therethrough directly. Further, a diffusion layer or a diffusion structure may be disposed on the glass substrate 171 to eliminate the generation of laser speckle.

The disc 120 is a metal disc, and the material thereof is, for example, but not limited to aluminum, silver, or copper. The protrusions 130 are formed by stamping a side of an outer edge of the disc 120 facing the light incident side S, and thereby forming a protruding structure on the side of the outer edge of the disc 120 facing the light incident side S, but the invention is not limited thereto. The protrusions 130 may be formed by coating, printing, or sticking aluminum, silver, copper or other metallic heat-conducting material on the disc 120.

The heat conductive glue 140 is disposed on the protrusion structure region 1221 and located between the protrusions 130 and above the protrusions 130. Further, the heat conductive glue 140 is filled in a void between the reflective layer 150 and the protrusions 130. A contact area between the protrusions 130 and the reflective layer 150 also has some of the heat conductive glue 140. Microscopically, there is still some of the heat conductive glue 140 between the protrusions 130 and the reflective layer 150. The reflective layer 150 is disposed between the heat conductive glue 140 and the wavelength-converting layer 160, but the invention is not limited thereto. When the heat conductive glue 140 is a transparent heat conductive glue, the reflective layer 150 may be coated or plated on the protrusion structure region 1221 and located above the protrusions 130, and the heat conductive glue 140 is disposed between the reflective layer 150 and the disc 120.

The wavelength-converting wheel 100 of the embodiment may reduce the overall usage of the heat conductive glue 140 between the wavelength-converting layer 160 and the disc 120 by the arrangement of the protrusions 130. In addition, compared with the position without the protrusions 130, the thickness of the heat conductive glue 140 at the position with the protrusions 130 is thinner. Accordingly, when the excited beam Le is irradiated on the wavelength-converting layer 160, in particular, the heat generated in the speckle region of the excited beam Le may pass through the reflective layer 150 quickly, be thermally conducted to the protrusions 130 via the heat conductive glue 140, and further be dissipated by the rotating disc 120. Thus, the situation in which the wavelength conversion efficiency of the wavelength-converting layer 160 and the reflection efficiency of the reflective layer 150 are damaged by excessive heat is avoided, and the problem that the materials of the wavelength-converting layer 160 and the reflective layer 150 are deteriorated and damaged due to excessive temperature is avoided. Since the energy density and temperature at the periphery of the speckle region of the excited beam Le are lower than those at the center of the speckle region of the excited beam Le, the heat dissipation requirement may be achieved by disposing a small number of the protrusions 130 or without disposing the protrusions 130 at the area corresponding to the periphery of the speckle region of the excited beam Le; further, a sufficient amount of the heat conductive glue 140 may be disposed to adhere the wavelength-converting layer 160 and the reflective layer 150. Thus, the advantages of adhesion strength and thermal conductivity may be achieved at the same time.

Figure 5:
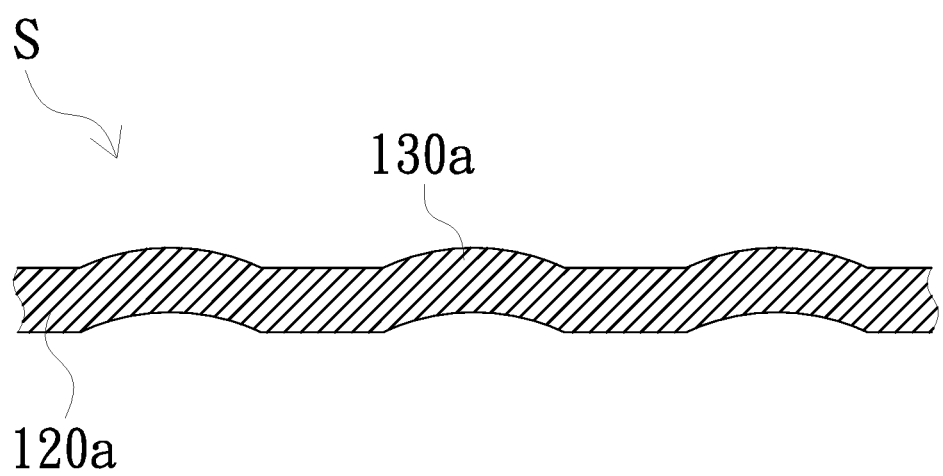
FIG. 5 is a partially schematic cross-sectional view of a disc and protrusions of a wavelength-converting wheel according to another embodiment of the invention.

FIG. 5 is a partially schematic cross-sectional view of a disc and protrusions of a wavelength-converting wheel according to another embodiment of the invention. Referring to FIG. 5, in the embodiment, the protrusions 130a are formed by stamping a side of an outer edge of the disc 120a facing away from the light incident side S. When the side of the outer edge of the disc 120a facing away from the light incident side S is stamped, the side of the outer edge of the disc 120a facing away from the light incident side S is recessed and the side of the outer edge of the disc 120a facing the light incident side S protrudes, so as to form the protrusions 130a.

Figure 6:
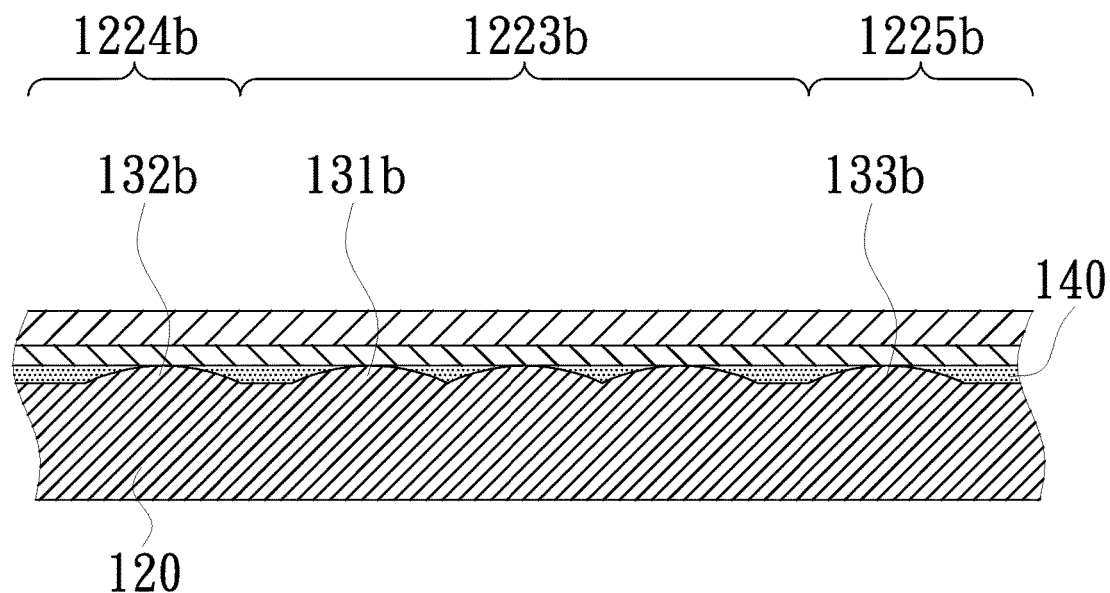
FIG. 6 is a partially schematic cross-sectional view of a wavelength-converting wheel according to another embodiment of the invention.
Figure 7:
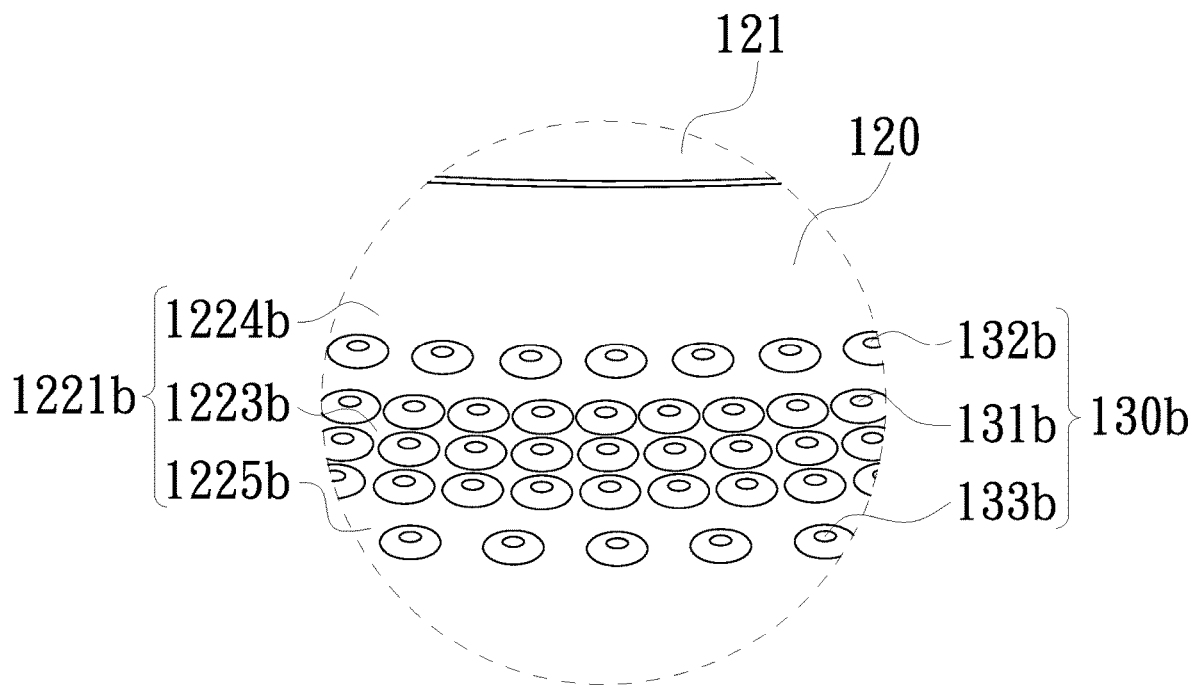
FIG. 7 is a partially enlarged view of a disc of the wavelength-converting wheel shown in FIG. 6.

FIG. 6 is a partially schematic cross-sectional view of a wavelength-converting wheel according to another embodiment of the invention. FIG. 7 is a partially enlarged view of a disc of the wavelength-converting wheel shown in FIG. 6. Referring to FIGS. 6 and 7, the protrusion structure region 1221b of the embodiment includes a central region 1223b, an inner region 1224b, and an outer region 1225b. The inner region 1224b is disposed between the central region 1223b and the inner ring portion 121. The outer region 1225b is disposed on a side of the central region 1223b away from the inner region 1224b. The protrusions 130b include a plurality of central protrusions 131b, a plurality of inner protrusions 132b, and a plurality of outer protrusions 133b. The inner protrusions 132b are disposed in the central region 1223b. The inner protrusions 132b are disposed in the inner region 1224b. The outer protrusions 133b are disposed in the outer region 1225b. An arranged density of the central protrusions 131b is larger than an arranged density of the inner protrusions 132b and an arranged density of the outer protrusions 133b. In addition, the protrusions 130b are formed by stamping an outer edge of the disc 120, or by coating, printing, or sticking aluminum, silver, copper or other metallic heat-conducting material on the disc 120.

In the wavelength-converting wheel of the embodiment, by adjusting the arranged density of the protrusions 130b, an amount of the heat conductive glue 140 at the central region 1223b is less than a sum of an amount of the heat conductive glue 140 at the outer region 1225b and an amount of the heat conductive glue 140 at the inner region 1224b. Further, the amount of the heat conductive glue 140 at the central region 1223b is less than 50% of a total amount of the heat conductive glue 140. For example, the total amount of the heat conductive glue 140 is 1, the amount of the heat conductive glue 140 at the central region 1223b ranges from 0.1 to 0.5 and is less than 0.5, and the sum of the amount of the heat conductive glue 140 at the inner region 1224b and the amount of the heat conductive glue 140 at the outer region 1225b ranges from 0.5 to 0.9 and is larger than 0.5. An arranged density of protrusions 130b may be inferred from the variation of the amount of the heat conductive glue 140. That is, the arranged density of central protrusions 131b at the central region 1223b is larger than 50% of the arranged density of the overall protrusions 130b. Both of the arranged density of the inner protrusions 132b and the arranged density of the outer protrusions 133b are less than 50% of the arranged density of the overall protrusions 130b.

In addition, the central region 1223b corresponds to the strongest portion of the speckle energy of the excited beam Le (the center of the speckle). When the excited beam Le is irradiated on the central region 1223b, the heat generated by the excited beam Le may pass through the heat conductive glue 140 and arrive at the central protrusions 131b more quickly, and further dissipate via the disc 120.

Figure 8:
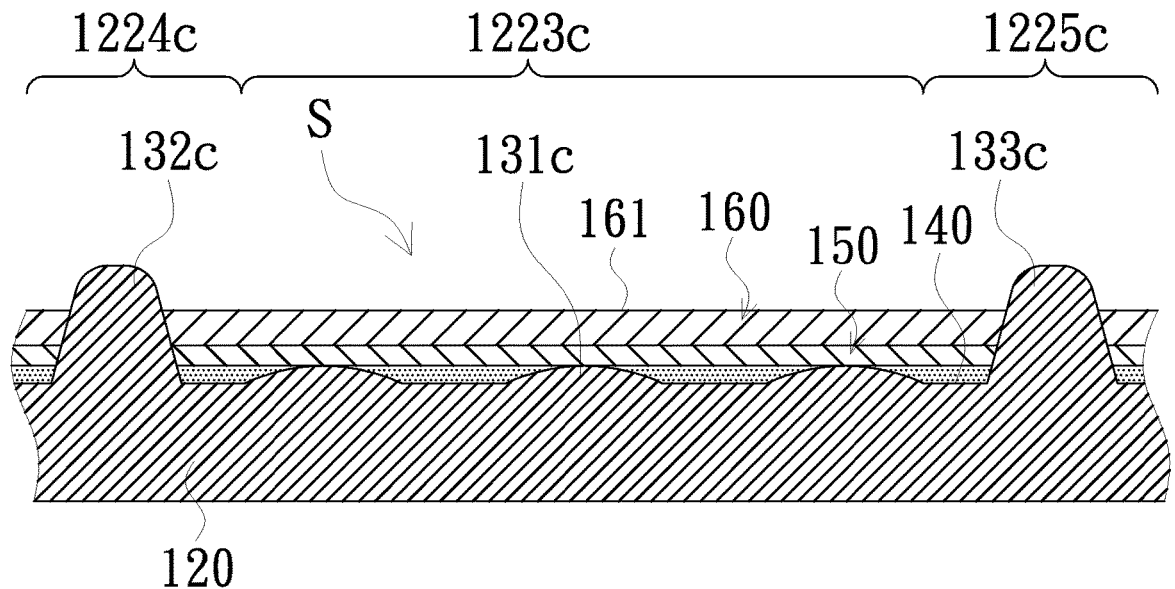
FIG. 8 is a partially schematic cross-sectional view of a wavelength-converting wheel according to another embodiment of the invention.
Figure 9:
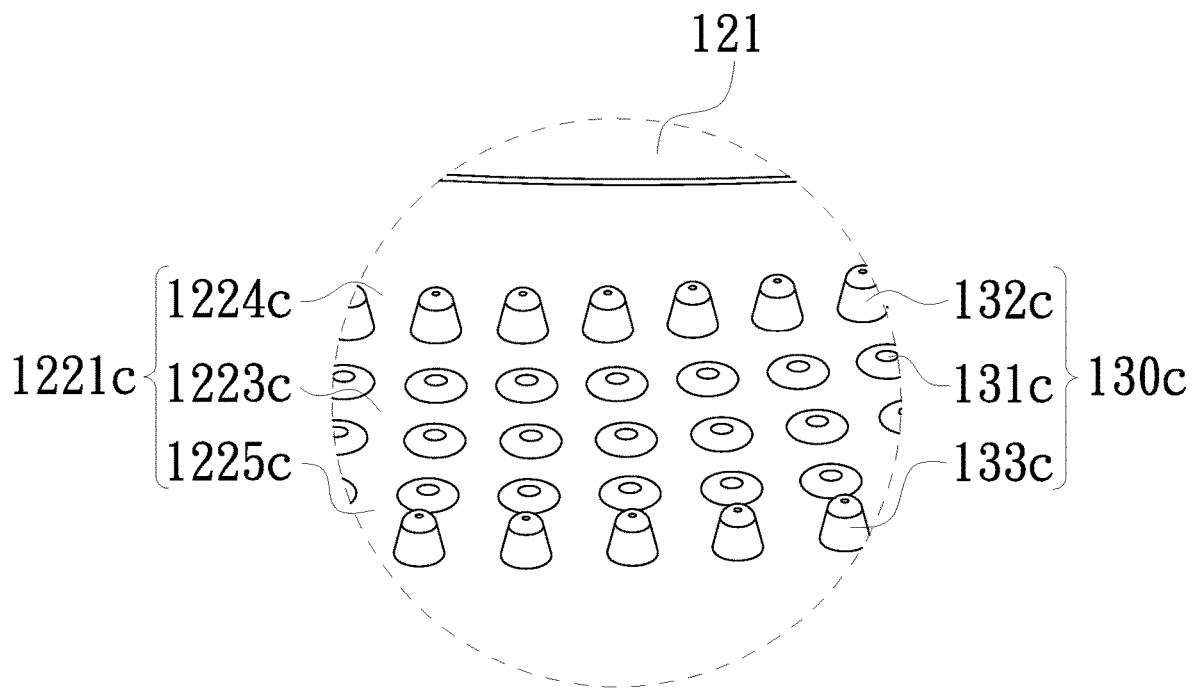
FIG. 9 is a partially enlarged view of a disc of the wavelength-converting wheel shown in FIG. 8.

FIG. 8 is a partially schematic cross-sectional view of a wavelength-converting wheel according to another embodiment of the invention. FIG. 9 is a partially enlarged view of a disc of the wavelength-converting wheel shown in FIG. 8. Referring to FIGS. 8 and 9, in the wavelength-converting wheel of the embodiment, at least some of the protrusions 130c extend toward the light incident side S, penetrate through the heat conductive glue 140, the reflective layer 150 and the wavelength-converting layer 160, and protrude out of the light receiving surface 161. The protrusion structure region 1221c includes a central region 1223c, an inner region 1224c, and an outer region 1225c. The inner region 1224c is disposed between the central region 1223c and the inner ring portion 121. The outer region 1225c is disposed on a side of the central region 1223c away from the inner region 1224c. The protrusions 130c include a plurality of central protrusions 131c, a plurality of inner protrusions 132c, and a plurality of outer protrusions 133c. The central protrusions 131c are disposed in the central region 1223c. The inner protrusions 132c are disposed in the inner region 1224c. The outer protrusions 133c are disposed in the outer region 1225c. The inner protrusions 132c extend toward the light incident side S, penetrate through the heat conductive glue 140, the reflective layer 150 and the wavelength-converting layer 160, and protrude out of the light receiving surface 161. In addition, the outer protrusions 133c extend toward the light incident side S, penetrate through the heat conductive glue 140, the reflective layer 150 and the wavelength-converting layer 160, and protrude out of the light receiving surface 161. Moreover, the protrusions 130c are formed by coating, printing, or sticking aluminum, silver, copper or other metallic heat-conducting material on the disc 120.

In the wavelength-converting wheel of the embodiment, since the inner protrusions 132c and the outer protrusions 133c penetrate through the heat conductive glue 140, the reflective layer 150 and the wavelength-converting layer 160, and protrude out of the light receiving surface 161, the heat of the reflective layer 150 and the wavelength-converting layer 160 may directly arrive at the disc 120 via the outer protrusions 133c and the inner protrusions 132c and dissipate.

Figure 10:
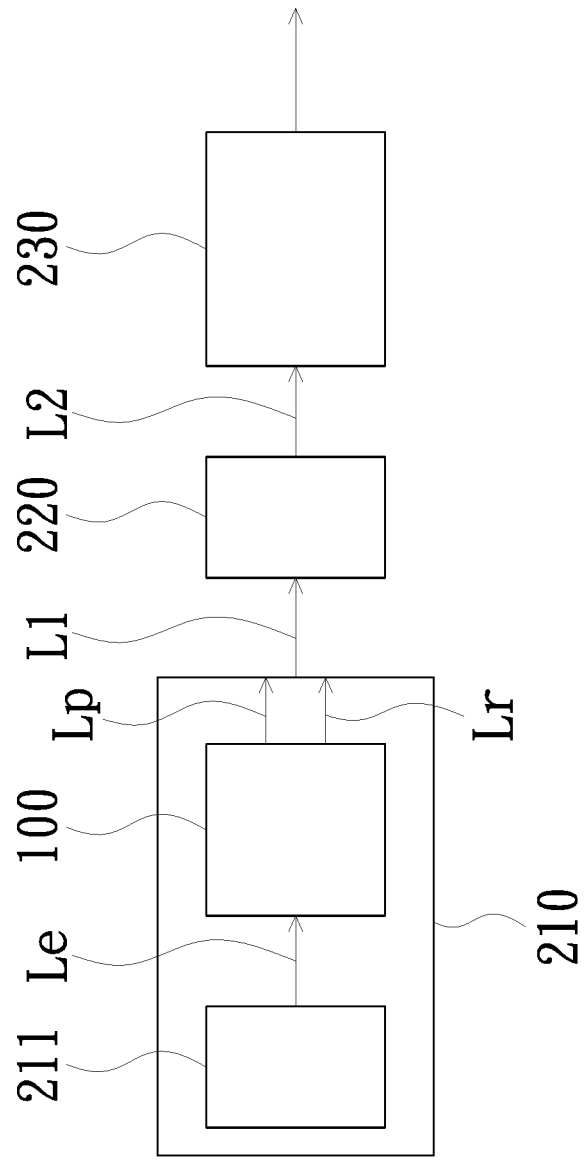
FIG. 10 is a schematic block diagram of a projection apparatus according to an embodiment of the invention.

FIG. 10 is a schematic block diagram of a projection apparatus according to an embodiment of the invention. Referring to FIG. 10, the projection apparatus 200 of the embodiment includes an illumination system 210, a light valve 220 and a projection lens 230. The illumination system 210 is configured to provide an illumination beam L1. The light valve 220 is disposed on a transmission path of the illumination beam L1 to convert the illumination beam L1 into an image beam L2. The projection lens 230 is disposed on a transmission path of the image beam L2 to project the image beam L2 onto a screen, so as to form an image on the screen. The light valve 220 may be a transmissive light valve or a reflective light valve, wherein the transmissive light valve may be a transmissive liquid crystal panel, and the reflective light valve may be a digital micro-mirror device (DMD) or a liquid crystal on silicon (LCOS) panel, but the invention is not limited thereto. The projection lens 230 includes, for example, a combination of one or more optical lenses having diopter, such as various combinations of non-planar lenses including biconcave lenses, biconvex lenses, concavo-convex lenses, convexo-concave lenses, plano-convex lenses, and plano-concave lenses. In an embodiment, the projection lens 230 may also include a planar optical lens. The type and species of the projection lens 230 are not limited in the invention.

Referring to FIGS. 1 and 10, the illumination system 210 includes an exciting light source 211 and a wavelength-converting wheel 100. The exciting light source 211 is, for example, a diode module or a diode module bank array including a light emitting diode or a laser diode (LD). The exciting light source 211 is configured to provide the excited beam Le, but the invention is not limited thereto. The wavelength-converting wheel 100 is disposed on the transmission path of the excited beam Le. Although FIG. 10 illustrates the wavelength-converting wheel 100 of FIG. 1 as an example, the wavelength-converting wheel 100 may be replaced with the wavelength-converting wheel of any one of the above-mentioned embodiments.

The excited beam Le is adapted to irradiate the annular portion 122 of the wavelength-converting wheel 100. The wavelength-converting layer 160 on the annular portion 122 is configured to convert the excited beam Le into a converted beam Lp when the wavelength-converting wheel 100 rotates around the rotating shaft 111. The converted beam Lp is subsequently reflected by the reflective layer 150. The wavelength of the converted beam Lp is different from the wavelength of the excited beam Le. The optical region 1222 is configured to reflect the excited beam Le, or allow the excited beam Le to penetrate therethrough (e.g., in FIG. 10, Lr denotes the excited beam reflected by the optical region 1222, or the excited beam penetrating through the optical region 1222). The illumination beam L1 includes the converted beam Lp and the excited beam Lr. The illumination system 210 further includes other optical elements, such as a light combining element, a filter wheel, a light homogenizing element, and a condenser lens, to transmit the illumination beam L1 to the light valve 220.

In summary, in the projection apparatus and the wavelength-converting wheel of the embodiments of the invention, by the arrangement of the protrusions on the disc of the wavelength-converting wheel facing the light incident side, the usage of the heat conductive glue to adhere the reflective layer and the wavelength-converting layer is reduced. In addition, the thickness of the heat conductive glue is controlled by the protrusions, in particular, the thickness of the heat conductive glue at the top of the protrusions is pretty thin, and the top of the protrusions is almost contacted with the reflective layer and the wavelength-converting layer directly. Accordingly, the heat generated by the irradiation of the excited beam may pass through the heat conductive glue quickly, the reflective layer and the protrusions, and then be dissipated by the disc. As such, the heat dissipating ability of the wavelength-converting wheel is improved, and thereby avoiding excessive heat to damage the wavelength conversion efficiency of the wavelength-converting layer and the reflection efficiency of the reflective layer, and ensuring the materials of the wavelength-converting and the reflective layer not deteriorated and not damaged by heat.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures. Any advantages and benefits described may not apply to all embodiments of the invention. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A wavelength-converting wheel having a light incident side, and the wavelength-converting wheel comprising:
   a disc, having an inner ring portion and an annular portion, wherein the annular portion is connected to an outer edge of the inner ring portion, the annular portion comprises a protrusion structure region, and a plurality of protrusions are disposed in the protrusion structure region and protrude toward the light incident side;
   a heat conductive glue, disposed on the protrusion structure region;
   a reflective layer, disposed on the heat conductive glue; and
   a wavelength-converting layer, disposed on the reflective layer and having a light receiving surface facing the light incident side.

2. The wavelength-converting wheel of claim 1, wherein the protrusion structure region comprises a central region, an inner region and an outer region, the inner region is disposed between the central region and the inner ring portion, the outer region is disposed on a side of the central region away from the inner region, the protrusions comprise a plurality of central protrusions, a plurality of inner protrusions, and a plurality of outer protrusions, the central protrusions are disposed in the central region, the inner protrusions are disposed in the inner region, and the outer protrusions are disposed in the outer region, and an arranged density of the central protrusions is larger than an arranged density of the inner protrusions and an arranged density of the outer protrusions.

3. The wavelength-converting wheel of claim 2, wherein the arranged density of the central protrusions is larger than 50% of an arranged density of the protrusions, and the arranged density of the inner protrusions and the arranged density of the outer protrusions both are less than 50% of the arranged density of the protrusions.

4. The wavelength-converting wheel of claim 1, wherein at least some of the protrusions extend toward the light incident side, penetrate through the heat conductive glue, the reflective layer and the wavelength-converting layer, and protrude out of the light receiving surface.

5. The wavelength-converting wheel of claim 1, wherein the protrusion structure region comprises a central region, an inner region and an outer region, the inner region is disposed between the central region and the inner ring portion, the outer region is disposed on a side of the central region away from the inner region, the protrusions comprise a plurality of central protrusions, a plurality of inner protrusions, and a plurality of outer protrusions, the central protrusions are disposed in the central region, the inner protrusions are disposed in the inner region, and the outer protrusions are disposed in the outer region, and the inner protrusions extend toward the light incident side, penetrate through the heat conductive glue, the reflective layer, and the wavelength-converting layer, and protrude out of the light receiving surface, the outer protrusions extend toward the light incident side, penetrate through the heat conductive glue, the reflective layer, and the wavelength-converting layer, and protrude out of the light receiving surface.

6. The wavelength-converting wheel of claim 1, wherein the protrusions are formed by stamping the disc.

7. The wavelength-converting wheel of claim 1, wherein the protrusions are formed by coating, printing, or sticking a metallic heat-conducting material on the disc.

8. The wavelength-converting wheel of claim 1, further comprising a plate, wherein the annular portion further comprises an optical region, the optical region is adjacent to the protrusion structure region, and the plate is disposed at the optical region and has a reflective surface facing the light incident side.

9. The wavelength-converting wheel of claim 1, further comprising a motor having a rotating shaft, wherein the inner ring portion is sleeved on the rotating shaft.

10. The wavelength-converting wheel of claim 1, wherein the heat conductive glue is disposed on the protrusion structure region, and is filled between the protrusions and above the protrusions.

11. A projection apparatus comprising:
    an illumination system, adapted to provide an illumination beam, and the illumination system comprising:
      an exciting light source, adapted to provide an excited beam; and
      a wavelength-converting wheel, disposed on a transmission path of the excited beam, and a wavelength-converting layer of the wavelength-converting wheel, adapted to convert the excited beam into a converted beam, and the wavelength-converting wheel having a light incident side, and the wavelength-converting wheel comprising:
        a disc, having an inner ring portion and an annular portion, wherein the annular portion is connected to an outer edge of the inner ring portion, the annular portion comprises a protrusion structure region, and a plurality of protrusions are disposed in the protrusion structure region and protrude toward the light incident side;
        a heat conductive glue, disposed on the protrusion structure region;
        a reflective layer, disposed on the heat conductive glue; and
        a wavelength-converting layer, disposed on the reflective layer and having a light receiving surface facing the light incident side;
    a light valve, disposed on a transmission path of the illumination beam to convert the illumination beam into an image beam; and
    a projection lens, disposed on a transmission path of the image beam.

12. The projection apparatus of claim 11, wherein the protrusion structure region comprises a central region, an inner region and an outer region, the inner region is disposed between the central region and the inner ring portion, the outer region is disposed on a side of the central region away from the inner region, the protrusions comprise a plurality of central protrusions, a plurality of inner protrusions, and a plurality of outer protrusions, the central protrusions are disposed in the central region, the inner protrusions are disposed in the inner region, and the outer protrusions are disposed in the outer region, and an arranged density of the central protrusions is larger than an arranged density of the inner protrusions and an arranged density of the outer protrusions.

13. The projection apparatus of claim 12, wherein the arranged density of the central protrusions is larger than 50% of an arranged density of the protrusions, and the arranged density of the inner protrusions and the arranged density of the outer protrusions both are less than 50% of the arranged density of the protrusions.

14. The projection apparatus of claim 11, wherein at least some of the protrusions extend toward the light incident side, penetrate through the heat conductive glue, the reflective layer and the wavelength-converting layer, and protrude out of the light receiving surface.

15. The projection apparatus of claim 11, wherein the protrusion structure region comprises a central region, an inner region and an outer region, the inner region is disposed between the central region and the inner ring portion, the outer region is disposed on a side of the central region away from the inner region, the protrusions comprise a plurality of central protrusions, a plurality of inner protrusions, and a plurality of outer protrusions, the central protrusions are disposed in the central region, the inner protrusions are disposed in the inner region, and the outer protrusions are disposed in the outer region, and the inner protrusions extend toward the light incident side, penetrate through the heat conductive glue, the reflective layer, and the wavelength-converting layer, and protrude out of the light receiving surface, the outer protrusions extend toward the light incident side, penetrate through the heat conductive glue, the reflective layer, and the wavelength-converting layer, and protrude out of the light receiving surface.

16. The projection apparatus of claim 11, wherein the protrusions are formed by stamping the disc.

17. The projection apparatus of claim 11, further comprising a plate, wherein the annular portion further comprises an optical region, the optical region is adjacent to the protrusion structure region, and the plate is disposed at the optical region and has a reflective surface facing the light incident side.

18. The projection apparatus of claim 11, wherein the heat conductive glue is disposed on the protrusion structure region, and is filled between the protrusions and above the protrusions.

* * * * *